(12) United States Patent
Marco

(10) Patent No.: US 11,522,666 B2
(45) Date of Patent: Dec. 6, 2022

(54) TSN SUPPORT

(71) Applicant: JRD Communication (SHENZHEN) LTD., Guangdong (CN)

(72) Inventor: Olivier Marco, Colombes (FR)

(73) Assignee: JRD Communication (SHENZHEN) LTD., Guangdong (CN)

( * ) Notice: Subject to any disclaimer, the term of this patent is extended or adjusted under 35 U.S.C. 154(b) by 0 days.

(21) Appl. No.: 16/965,217

(22) PCT Filed: Feb. 12, 2020

(86) PCT No.: PCT/CN2020/074821
§ 371 (c)(1),
(2) Date: Jul. 27, 2020

(87) PCT Pub. No.: WO2020/164501
PCT Pub. Date: Aug. 20, 2020

(65) Prior Publication Data
US 2021/0367742 A1   Nov. 25, 2021

Related U.S. Application Data

(60) Provisional application No. 62/805,796, filed on Feb. 14, 2019.

(51) Int. Cl.
*H04L 5/00* (2006.01)
*H04W 72/14* (2009.01)

(52) U.S. Cl.
CPC ......... *H04L 5/0078* (2013.01); *H04W 72/14* (2013.01)

(58) Field of Classification Search
None
See application file for complete search history.

(56) References Cited

FOREIGN PATENT DOCUMENTS

| EP | 3610590 B1 * | 3/2021 | ............ H04L 45/38 |
| WO | 2018191109 A1 | 10/2018 | |

(Continued)

OTHER PUBLICATIONS

Sequans et al. "Correction of Configured Grant Formula" R2-1811965 submitted in the IDS by the applicant (Year: 2019).*

(Continued)

*Primary Examiner* — Jamaal Henson
(74) *Attorney, Agent, or Firm* — PV IP PC; Wei Te Chung; Ude Lu

(57) ABSTRACT

Processes and systems for managing preconfigured resources, in particular wireless transmission resources. The disclosure particularly addresses the management of preconfigured resources in relation to Time Sensitive Network (TSN) data transmission. In addition to allocating periodic preconfigured resources, an allowed transmission window (ATW) is defined. The ATW defines which occurrences of the preconfigured resources may be utilised for transmission, in particular which uplink transmission resources may be utilised by a UE. The ATW may be aligned with the expected time of arrival of TSN data (typically the ingress time window) such that the TSN data can be promptly transmitted. The occurrences which occur outside of the ATW are not to be used for transmission and hence may be re-allocated by the base station for other uses.

6 Claims, 15 Drawing Sheets

(56) References Cited

FOREIGN PATENT DOCUMENTS

WO    WO-2020067978 A1 *   4/2020   .......... H04W 72/042
WO    WO-2020155149 A1 *   8/2020

OTHER PUBLICATIONS

"Correction of Configured Grant formula", Sequans Communications, 3GPP TSG-RAN WG2 Meeting #103, R2-1811965, Aug. 2018.
"On support for deterministic periodic traffic with configured grants", Ericsson, 3GPP TSG-RAN WG2 #104, R2-1817174, Revision of R2-1814815, Nov. 2018.
"Impact of CG/SPS with periodicities non dividing HF length", Sequans Communications, 3GPP TSG-RAN WG2 Meeting #108, R2-1916231, Nov. 2019.
Ericsson, "Additional TSN traffic pattern for RAN optimization", 3GPP TSG-SA WG2 Meeting #130, S2-1901234, Jan. 25, 2019.
Ericsson, "Additional TSN traffic pattern for RAN optimization", 3GPP TSG-SA WG2 Meeting #130, S2-1900610, Jan. 25, 2019.
IEEE Standards Association, Bridges and Bridged Networks, Amendment 31: Stream Reservation Protocol (SRP) Enhancements and Performance Improvements.
IEEE Standards Association, Bridges and Bridged Networks, Amendment 25: Enhancements and Scheduled Traffic.
"Additional TSN traffic pattern for RAN optimization", Ericsson, 3GPP TSG-SA WG2 Meeting #130, S2-1901234, Jan. 25, 2019.
"Additional TSN traffic pattern for RAN optimization", Ericsson, 3GPP TSG-SA WG2 Meeting #130, S2-1900610, Jan. 25, 2019.

* cited by examiner

TSN SUPPORT

CROSS-REFERENCE TO RELATED APPLICATIONS

This application is a National Stage of International patent application PCT/CN2020/074821, filed on Feb. 12, 2020, which claims priority to U.S. Provisional Patent Application No. 62/805,796 filed Feb. 14, 2019, the disclosures of which are incorporated by reference in their entirety.

TECHNICAL FIELD

The following disclosure relates to methods for configuring Configured Grant Resources, and in particular for configurations relating to Time Sensitive Network configurations.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The disclosure below relates to various improvements to cellular wireless communications systems.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
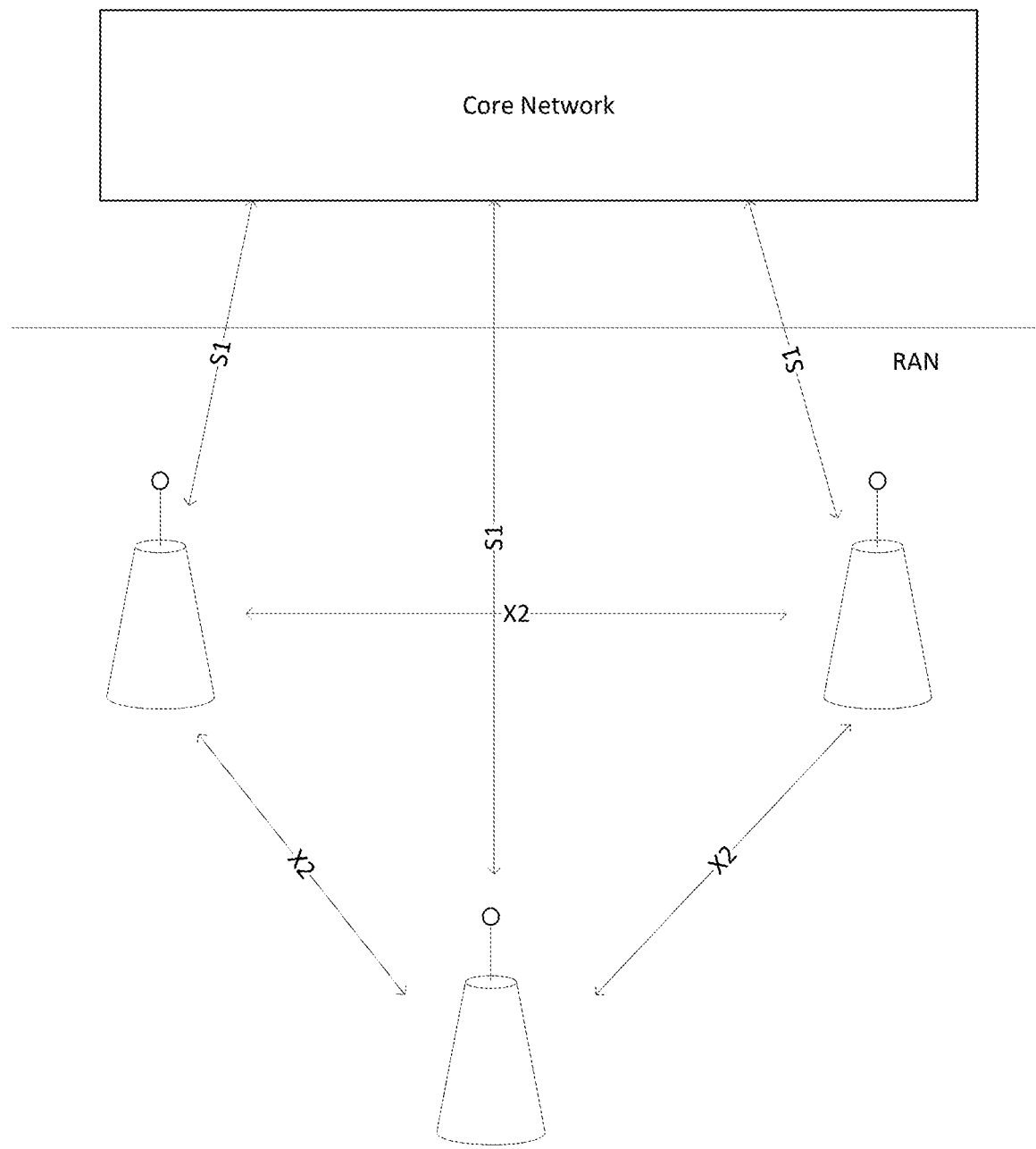
FIG. 1 shows a schematic diagram of selected components of a cellular communications network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Cellular radio systems may provide methods to configure periodic resources in UL and/or DL. This avoids the need for dynamic grant of resources as they are required by the UE or base station. Specific examples of such processes are Semi-Persistent Scheduling (SPS) (UL and DL in LTE, and DL in NR) and Configured Grant Type 1 and Type 2 (CG) (UL in NR). For convenience the generic term preconfigured resources will be utilised to refer to resources configured according to these, or comparable, processes.

IEEE P802.1Qcc/D1.6 describes various Time Sensitive Network (TSN) configuration models. In a TSN network TSN end stations (Talker/Listener) as well as TSN bridges are synchronised which enables the establishment of schedules of TSN flows between TSN end stations such that minimal latency is ensured. Particular examples are the fully distributed, centralised network and distributed user, and centralised network configuration (CNC), and fully centralised models.

TSN traffic is typically periodic, deterministic (bounded latency), as well as scheduled, i.e. with a known transmission time (and possibly known jitter) relative to a time reference. TSN scheduled traffic enhancements are detailed in 802.1Qbv specification.

A TSN bridge supporting scheduled traffic (802.1Qbv) can prioritize traffic in time windows to reduce latency for traffic received in those windows. For such prioritized traffic, the expected latency is very low. In a TSN network, TSN bridges and TSN capable end devices are time synchronized with high precision (e.g. around 1 us) and share the same concept of time, which assists the network to meet the latency and reliability requirements of such traffic. For each TSN flow, a time schedule can be established within the TSN network such that the end-to-end latency for that flow is guaranteed.

It is possible to configure deterministic periodic traffic from a TSN talker end station to a TSN listener end station such that the traffic occurs during specified periodic time windows. Each TSN bridge in the TSN network guarantees the latency for incoming traffic during such ingress windows, and also ensures transmission of the traffic within a specified egress window to the next node in the network.

Figure 2:
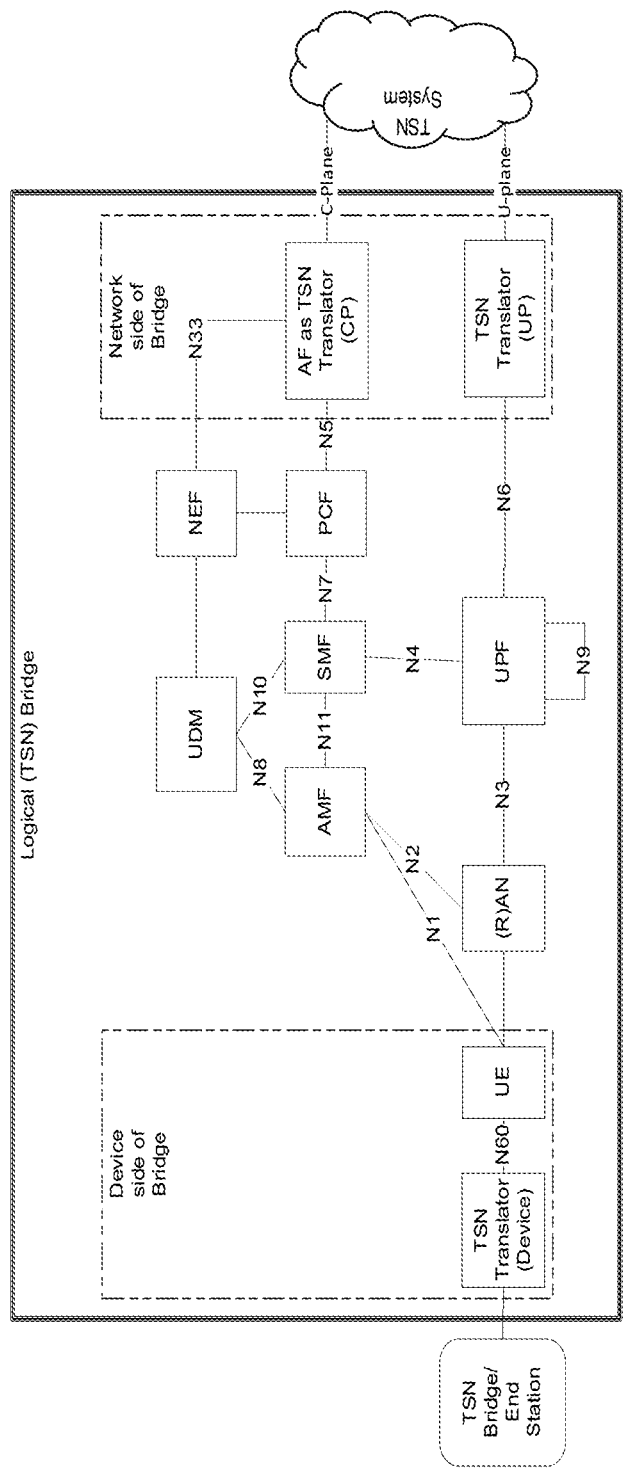
FIG. 2 shows a schematic diagram of a cellular network as a TSN bridge node.
Figure 3:
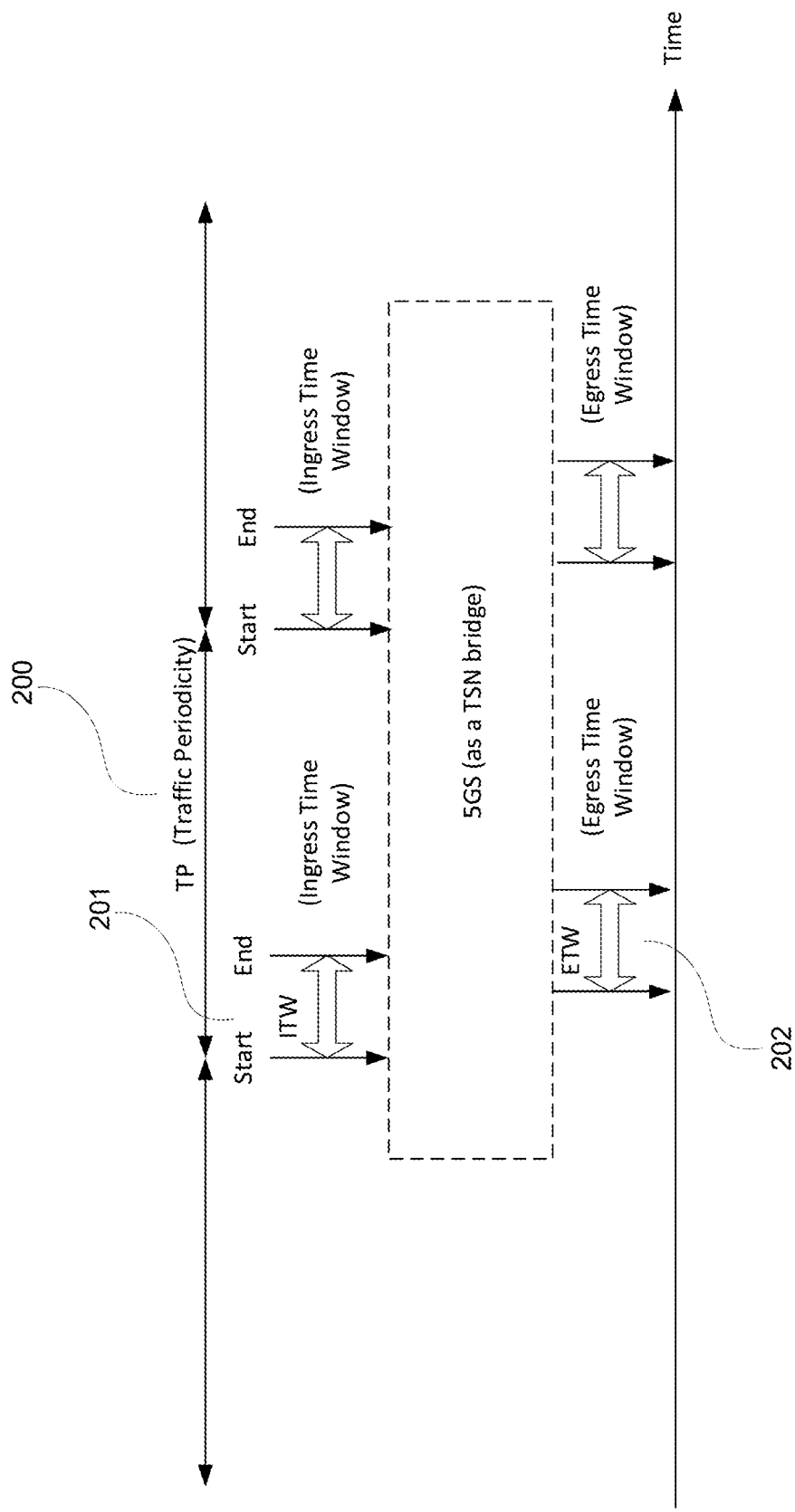
FIG. 3 shows a diagram of ingress and egress time windows.

Integration of cellular systems, in particular 5G/NR, has been considered and defined by specifying that cellular systems (including UE, RAN, and Core Network) will appear as a TSN bridge (black box). The cellular system utilises a QoS framework in which applications can request QoS properties that the cellular system meets according to its operating methods. FIG. 2 shows an example model of a cellular system acting as a bridge, with UPF on one side and UE(s) on the other side as part of a common TSN bridge FIG. 3 shows a diagram of TSN traffic flow through a TSN bridge. The Traffic Periodicity (TP) 200 defines the period between Ingress Time Windows (ITW) 201 within which data can be expected to arrive at the TSN bridge. The ITW is the window around an arrival time created due to the arrival time offset and jitter. The Egress Time Window (ETW) 202 represents the window in which data received in a corresponding ITW will be output from the TSN bridge and is negotiated during establishment of the schedule by the TSN bridge.

The TSN bridge may also be aware of other parameters such as message size, and reference time or offset.

As noted above, preconfigured resources may be allocated for a UE. Specific examples of which are CG and SPS. Preconfigured resources are periodic time/frequency transmission resources allocated for transmission of data in UL or DL. The periodicity and location in time of the resources is defined by the RAN radio frame structure (slots/OFDM symbols). Preconfigured resources have 2 main different use cases: support of periodic traffic (examples is 20 ms periodicity defined for transport of voice traffic), and support of low latency sporadic traffic, by skipping transmission when there is no data to be send (example is 1 ms for providing low latency).

TSN traffic is expected to be both periodic and latency critical, with known sending time (traffic time offset). It is expected that 5GS, acting as a TSN bridge, is synchronized with high precision to other TSN devices in the network so that all devices share the same concept of time.

When carrying TSN data using preconfigured resources the latency and jitter introduced may be dependent on the periodicity of the assigned resources and the relationship of that period with the TSN data arrival times.

In order to ensure transmission latency below a budget L (at RAN level), CG with periodicity P lower than L can be configured (taking into account additional margin delay such as transmission time or delay due to retransmissions). The periodicity P can hence be directly set according to the lowest required latency of the traffic to be supported by the corresponding CG/SPS configuration.

Figure 14:
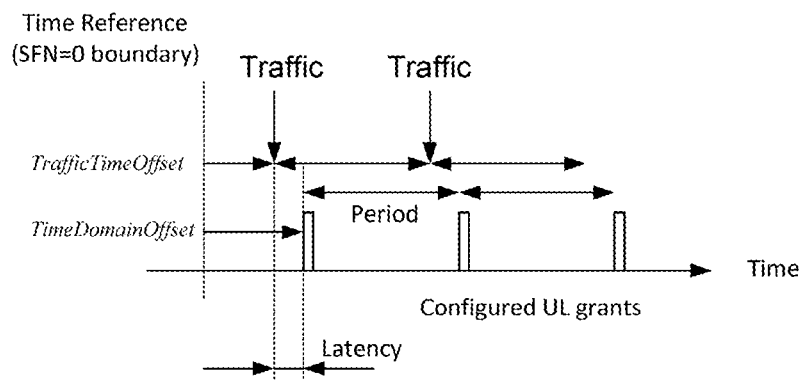
FIGS. 14 and 15 exhibit potential difficulties with alternative solutions.

Whenever TSN traffic periodicity matches an available CG periodicity, the transmission latency can be reduced as desired by adjusting the CG time offset, without resource waste (See FIG. 14).

Figure 15:
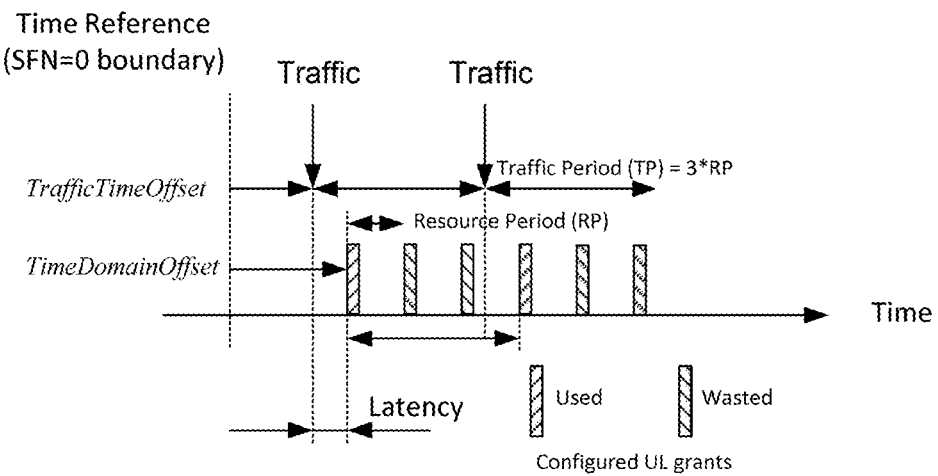

Whenever TSN traffic periodicity matches a CG periodicity multiple, the transmission latency can also be reduced as desired by adjusting the CG time offset, similarly as above. We consider as an example a traffic periodicity (TP) of 15 ms. The CG periodicity 15 ms is not supported; however, 5 ms is supported and may be used to match the traffic periodicity. Contrary to previous case, the drawback is a waste of reserved resources (See FIG. 15).

As CG periodicity is related to RAN radio frame structure, in general there is no guarantee that TSN traffic periodicity matches available CG periodicities (including their multiples). In 802.11Qbv, the cycle time is a rational number of seconds, defined by an integer numerator and an integer denominator (both UINT32), i.e., the cycle duration is an arbitrary rational number of seconds.

In this case, there will be a drift between the CG pattern and the traffic pattern. Hence, the approach based on adjusting CG time offset is not possible to control the latency, unless frequent adjustment are made to compensate for the drift between both patterns. Such frequent adjustments are not desirable as they increase the control traffic and the risk of configuration error, for a traffic which has not only tight latency requirements but also very high reliability requirements.

Figure 4:
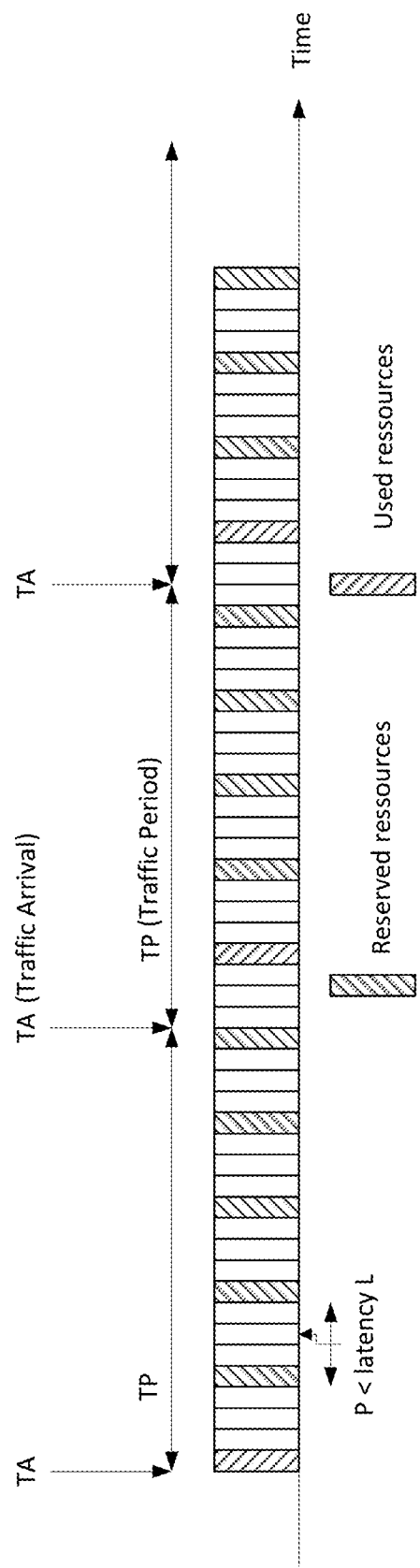
FIG. 4 shows an example of preconfigured resource utilisation.

In order to ensure transmission latency below a budget L (at RAN level), the periodicity P of preconfigured resources must be lower than value L, as shown in FIG. 4. The periodicity of resources can thus be defined based on the minimum latency required for the traffic to be supported by the preconfigured resources, taking into account additional margin delay such as transmission time or delay due to retransmissions. Although this ensures latency requirements are met, it may be inefficient in terms of resource utilisation. To ensure the latency requirements are met the period P of the preconfigured resources may be substantially less than the TSN traffic period, and hence multiple preconfigured resources occur in each TSN traffic period which are not required, as shown in FIG. 4.

Once assigned for a UE, preconfigured resources are not directly mapped for a TSN traffic flow and hence the system may not be aware of which resources will be used. This prevents re-use of unused resources. For example, for UL TSN traffic a base station may not be aware which preconfigured resources the UE will use and hence cannot allocate unused resources for other purposes.

Another alternative is to match the resource pattern with the traffic pattern. The effective allocated resource is then the first in time associated to a SymbolIndex (or SlotIndex) following (and including) the SymbolIndex derived by CG or SPS formula, and which is also allowed by the corresponding physical layer PUSCH or PDSCH configuration.

Figure 10:
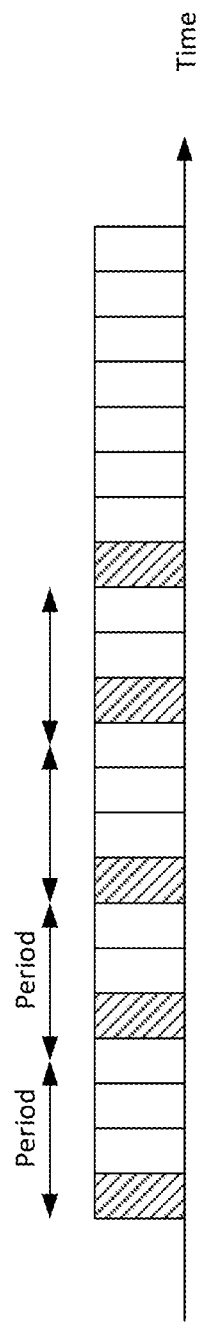
FIG. 10 shows preconfigured resources with a pseudo-periodic spacing.

As a result, the SPS/CG would no longer be periodic (in terms of symbols or slots), but pseudo-periodic, as shown in FIG. 10.

Such an approach may allow preconfigured resources to match more closely the TSN traffic pattern. This allows latency to be reduced and resource efficiency increased. However, the approach may lack flexibility, as the resource allocated is "the next in time allowed by the corresponding PUSCH or PDSCH configuration", for which the configuration is limited (it is configured only by the corresponding UL grant or DL assignment). For instance, a given traffic may not need the lowest possible latency which is provided by this scheme.

As it can be seen, in case of unmatched Traffic Periodicity/CG Periodicity (or multiple thereof), the following issues appear:
frequent CG time offset adjustments or,
impeded time multiplexing capabilities (if CG periodicity is extended to match traffic periodicity)
important resource waste (if CG periodicity matching required latency is preferred).

Figure 5:
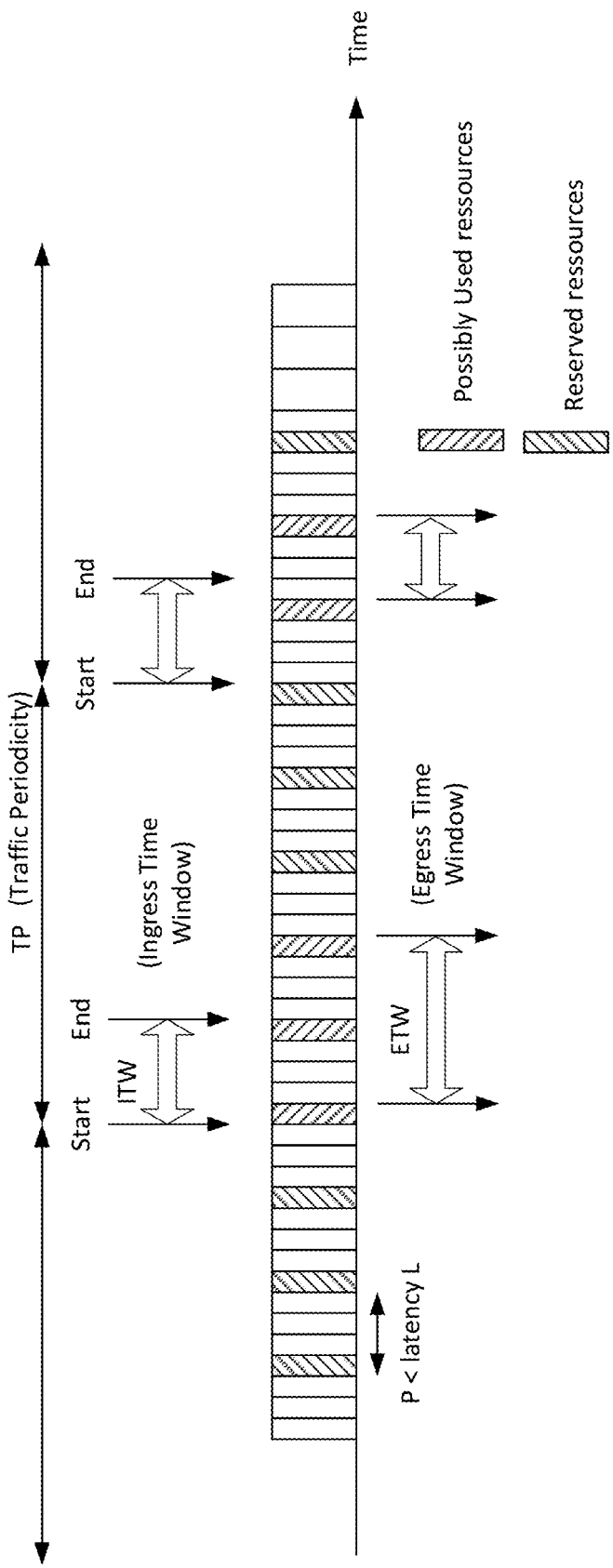
FIGS. 5 & 6 show examples of preconfigured resource utilisation in relation to ingress and egress windows.

An additional potential issue (See FIG. 5) is that the egress time window (after the RAN of the cellular network forming the TSN bridge) may be larger than the ingress time window. That is, the RAN may not only add latency but also jitter. In cases where a cellular network is integrated into a TSN network, connected for instance to a further TSN bridge, it could be desired that the ingress time window of this further TSN bridge is short, i.e. that the egress time window of the cellular network bridge is short. The egress time window enforcement could be realized at higher layers of the cellular network (out of the RAN), for instance in the TSN translator interfacing with the TSN system. That would mean in such case that the cellular system has to hold on to packets transmitted "too fast" by the RAN before forwarding them out of the cellular network. This reduces jitter but increases latency for some data. It is preferable instead to relax RAN requirements to enable better usage of radio resources.

Given the knowledge of TSN traffic, it is possible to avoid resource waste by constraining the UE to transmit only on specific occasions, or equivalently in defined windows—i.e. to ensure that the CG pattern does not provide transmit occasions which will (most of the time) not be used. This can be achieved by only providing preconfigured resources within those windows, and not elsewhere. Provided the TSN traffic pattern is known, the preconfigured resources should not need to be dynamically adjusted in order to avoid additional frequent control signalling.

As described earlier, the CG is used mainly for either periodic or low latency traffic. The corresponding time configuration (periodicity/time offset) has to be set according either to traffic periodicity, or to traffic latency requirement.

TSN traffic has both periodic pattern and low latency requirements, which may be handled efficiently by existing preconfigured resource allocations. It would be beneficial to enhance existing preconfigured resource allocation processes so that they encompass both the constraints of the RAN frame structure and of the TSN traffic. For this purpose, the preconfigured resource configuration may be enhanced such that it is based on both:
A boundary/resource pattern (periodicity/time offset), aligned with RAN frame structure, which can be used to ensure the desired latency requirement is met.
A traffic/allowed transmission pattern (periodicity/time offset), which can be used to match the traffic pattern, and may have an arbitrary periodicity Two potential options to enhance existing preconfigured resource allocations:
Consider the existing preconfigured resource pattern as the boundary/resource pattern, and add an "allowed transmission window" pattern.
Extend the existing preconfigured resource pattern so that it can be used as the traffic pattern, and define a boundary/resource pattern to select the resource.

Both options are described in further details below.

A first option considers introducing an Allowed Transmission Window. In order to efficiently manage preconfigured resources a window, for example "Allowed Transmission Window (ATW)" may be configured in addition to the periodic preconfigured resources. Preconfigured resources falling within the ATW are for use as allocated, whereas preconfigured resources falling outside of the ATW are not to be utilised as allocated and the resources may be utilised by the base station for a different purpose. Such a system is most likely to be applied to preconfigured uplink resources as the base station does not otherwise have awareness the resources will not be used. The provision of the ATW enables the base station to use the preconfigured resources for another purpose, for instance to allocate them to a different UE, without a risk of collision with an uplink transmission in the resources. However, the principles may be applied to uplink and downlink resources of any configuration.

The ATW pattern may be defined based on the TSN traffic schedule, such as periodicity and time offset, as well as ingress and egress time windows.

The ATW pattern may be defined by a set of parameters, for example, window periodicity, offset, and length.

The ATW periodicity should be configurable to correlate with anticipated TP of the TSN data flow. The period should there by a rational number seconds wherein the timing is radio timing (1 s=100 radio frames). Said another way, the periodicity may be a rational number of radio frames.

The window offset may be defined relative to SFN 0 of the radio hyperframe, defined as a rational number of seconds or radio frames (e.g. by signalling a numerator and denominator). If the period is a divisor of the hyperframe length the offset may relative to the same SFN in each hyperframe, for example SFN 0. If the period is not a divisor of the hyperframe the offset may be relative to a SFN which depends on the hyperframe, as explained in more detail below.

The length of the ATW may be defined as a duration in time (e.g. number of symbols or a rational number of subframes, or as a number of grants of the preconfigured resources (with a minimum of 1).

These parameters permit all relevant aspects of the ATW to be defined to unambiguously specify which resources are available in a period cycle. Some or all of the parameters may be predefined and static to reduce control overhead.

The ATW may be configured and communicated by an RRC process and messaging together with the preconfigured resources configuration, or with an RRC LCH configuration, for example as part of mapping restrictions. For example, the ATW may only allow mapping of an LCH to preconfigured resources within the ATW which has an equivalent effect of preventing use of the preconfigured outside of the ATWs.

When an ATW is configured, MAC maintains a periodic allowed transmission window pattern, related to UL preconfigured resources or related to an LCH mapping rule. After deriving possible UL preconfigured resources from the UL preconfigured resources configuration, the MAC may consider as valid only the ones allowed by the ATW.

As noted above, the ATW must be defined unambiguously to identify which preconfigured resources part of the underlying CG or SPS pattern are available for use, i.e. are effectively preconfigured resources. As it is desirable for the ATW to match the likely TP the ATW might start at any time, including at a fractional number of subframes. A possible rule is to translate this timing to symbols using 1 radio frame=numberOfSlotsPerFrame×numberOfSymbolsPerSlot.

That is, the window is defined assuming symbols are evenly distributed within a slot. It doesn't matter if at the physical level the timing at symbol level is slightly different (for example due to cyclic prefix) since the rule is only used to identify without any ambiguity which preconfigured resources fall within the ATW, and which ones are outside.

As discussed above, the length of the ATW may be defined. The length may be defined as a time duration (e.g. number of symbols or a rational number of subframes).

In case an Allowed Transmission Window is configured, MAC maintains an allowed transmission window pattern as follows After an allowed transmission window is configured for a configured grant, the MAC entity may consider sequentially that an allowed transmission window starts associated with the symbol for which:—

[(SFN×numberOfSlotsPerFrame×numberOfSymbolsPerSlot)+(slot number in the frame×numberOfSymbolsPerSlot)+symbol number in the slot]=Floor[(SFN$_{start\ time}$+TransmitWindowTimeOffset+N×TransmitWindowPeriodicity)×numberOfSlotsPerFrame×numberOfSymbolsPerSlot] modulo(1024×numberOfSlotsPerFrame× numberOfSymbolsPerSlot)

And that it ends associated with the symbol for which:—

[(SFN×numberOfSlotsPerFrame×numberOfSymbolsPerSlot)+(slot number in the frame×numberOfSymbolsPerSlot)+symbol number in the slot]=Floor[(SFN$_{start\ time}$+TransmitWindowTimeOffset+TransmitWindowLength+N×TransmitWindowPeriodicity)×numberOfSlotsPerFrame× numberOfSymbolsPerSlot]modulo(1024× numberOfSlotsPerFrame× numberOfSymbolsPerSlot)

where SFN$_{start\ time}$ is the SFN timeReferenceSFN immediately preceding the reception of the preconfigured resources configuration.

The MAC entity thus utilises (for example by only retaining details of) preconfigured resources from the corresponding CG or SPS pattern with a symbol index that falls with in the allowed transmission window. For instance when an Allowed Transmission Window is configured for a configured grant, MAC shall retain only the UL grants of the CG associated with a symbol index which falls within an allowed transmission window, and ignore other UL grants of the CG.

As will be apparent, ceil operations may be utilised instead of the floor example above.

Figure 6:
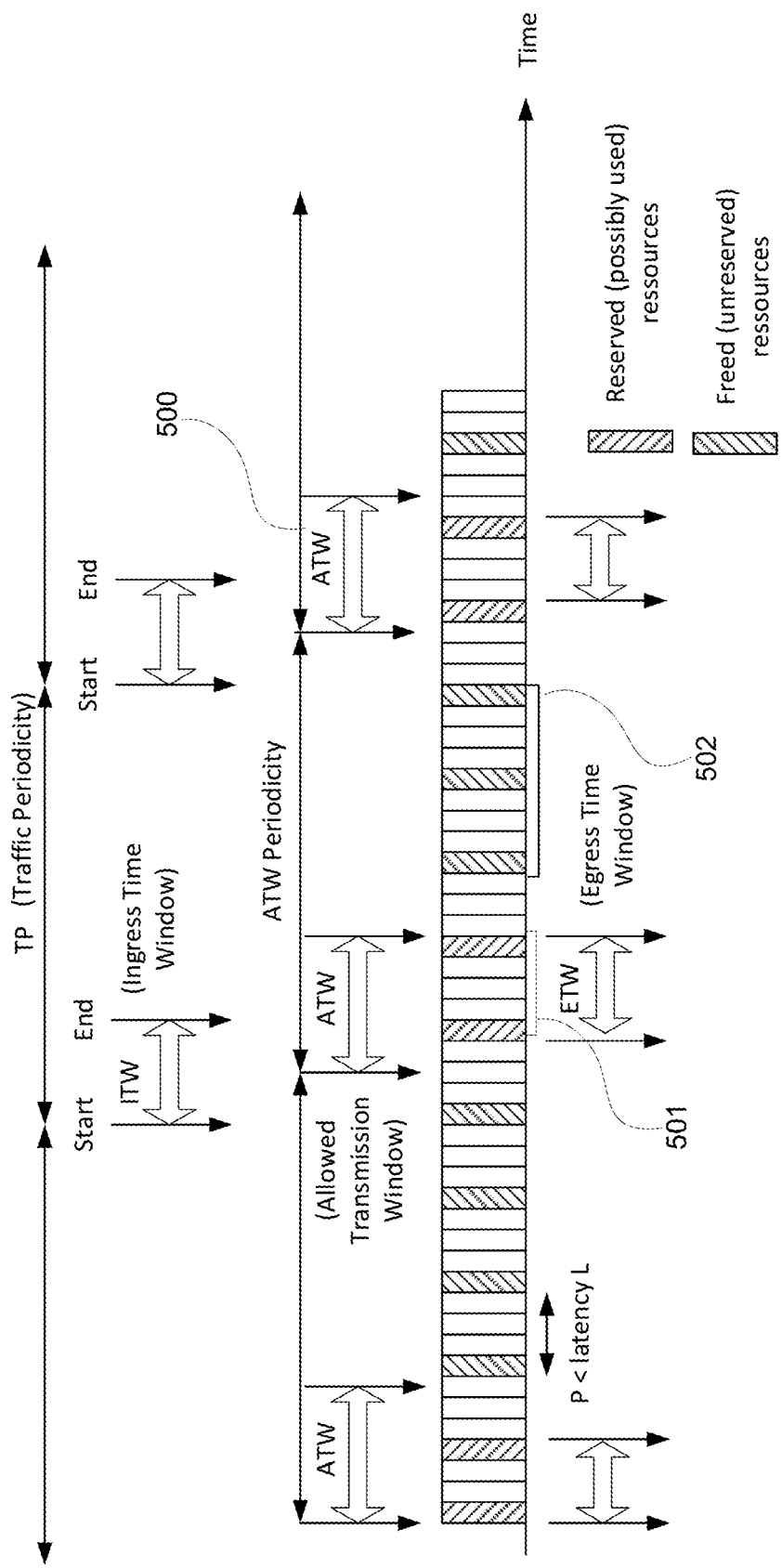

FIG. 6 shows an example in which ATWs 500 are defined with a period aligned to the TP. The ATW provides two occurrences 501 of preconfigured resources that fall within the ATW and which are therefore available for use for TSN traffic, followed by a number of occurrences 502 which are not available as they fall outside of the ATW. The number of unavailable occurrences 502 may vary depending on the alignment of the ATW with the preconfigured resources.

The length of the ATW may also be defined based on a number of occurrences of preconfigured resources. In case an Allowed Transmission Window is configured, MAC maintains an allowed transmission window pattern as follows:—

After an allowed transmission window is configured for a configured grant, the MAC entity may consider sequentially that an allowed transmission window starts associated with the symbol for which:

[(SFN×numberOfSlotsPerFrame×numberOfSymbolsPerSlot)+(slot number in the frame×numberOfSymbolsPerSlof)+symbol number in the slot]=Floor[(SFN$_{start\ time}$+TransmitWindowTimeOffset+N×TransmitWindowPeriodicity)×numberOfSlotsPerFrame×numberOfSymbolsPerSlot] modulo(1024×numberOfSlotsPerFrame× numberOfSymbolsPerSlot)

where SFN$_{start\ time}$ is the SFN timeReferenceSFN immediately preceding the reception of the preconfigured resources configuration.

When an ATW is configured with a length TransmitWindowLength the MAC entity retains only the TransmitWindowLength first consecutive occurrences of the preconfigured resources from the preconfigured resources associated with a symbol index equal or following the symbol associated to an allowed transmission window start, and ignore other preconfigured resources.

Alternatively, it could be considered that instead of Transmission Window Start, Transmission Window End is indicated, and that the MAC entity retains only the TransmitWindowLength last consecutive occurrences of the preconfigured resources from the preconfigured resources associated with a symbol index preceding the symbol associated to an allowed transmission window end, and ignore other preconfigured resources. This could for instance be used to better match the resource with an egress window, rather than match the resources with an ingress window.

Figure 7:
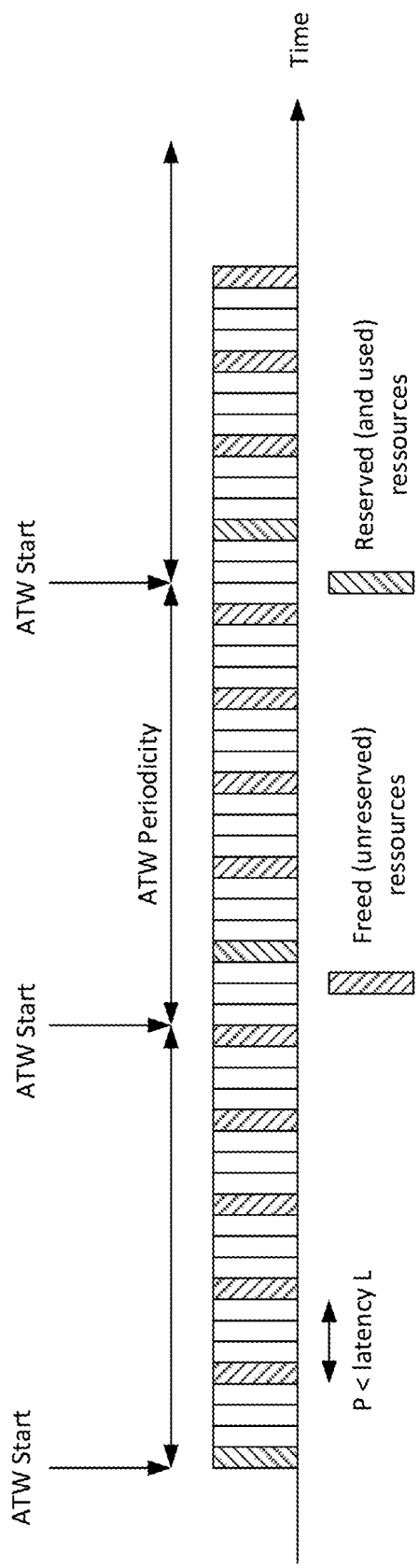
FIG. 7 shows an example of resources use with an allowed transmission window.
Figure 8:
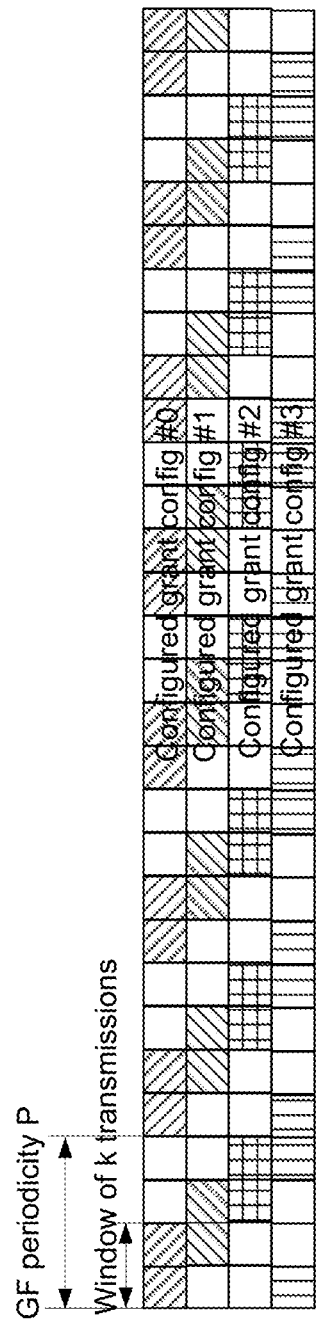
FIG. 8 shows an example of multiple configurations.

FIG. 7 shows an example in which TransmitWindowLength is equal to one occurrence of the preconfigured resources. More than one preconfigured resources configuration may be supported to permit sending of K repetitions for any start time offset, as shown in FIG. 8. For such configurations, it may be beneficial to consider such multiple configurations set as a bundle of configurations providing transmission opportunities (possible preconfigured resources) with a reduced periodicity (P/4 in FIG. 8). This enables only one ATW configuration to be defined for the multiple preconfigured resource configurations.

A second option considers extending the CG or SPS periodicity. The cycle time defined for TSN data (in 802.1Qbv) is a rational number of seconds, defined by an integer numerator and an integer denominator (both UINT32 in this example). That is, the cycle is a rational number of seconds. The cycle time may therefore not match a symbol or slot period and so a more flexible definition of periodic resources may be beneficial which is not perfectly regular to best align with the TSN cycle. A rational traffic period may thus be defined by signalling a numerator and denominator In particular examples, periodic the SPS or CG could be extended to support rational traffic period P as set out in more detail below. Similarly, as described above, the formula can be reused to deliver a rational SymbolIndex (CG, SPS if the granularity is enhanced) or SlotIndex (SPS). A floor or ceil operation can be used to identify without ambiguity the SymbolIndex (or SlotIndex).

The formula for location of preconfigured resources then indicates arbitrary time instants (possibly as a fraction of symbols) not matching an actual resource:—

SymbolIndex_Within_HF=SymbolOffsetFromRefWithin_P+
N*P modulo Symbols_Per_HF

Figure 9:
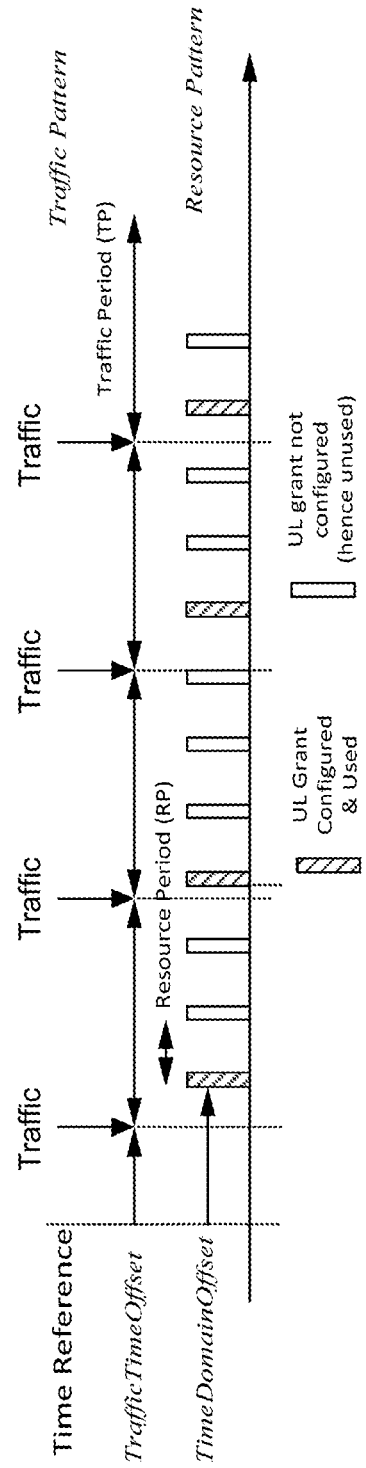
FIG. 9 shows an example of resources selected from a frame/boundary pattern.

To determine the preconfigured resource to be utilised for transmission of traffic, a boundary/resource pattern (i.e a pattern aligned with the RAN frame structure) would be used in which preconfigured resources are aligned with the RAN frame structure. The earliest resource from that pattern following an indicated Symbol, as shown in FIG. 9, would be selected.

This approach may ensure that a latency target can be met by defining an appropriate period for the preconfigured resources, but unrequired resources are available for other uses. In an alternative, the first available resource, according to fixed rules such as next slot boundary (instead of having it selected from a resource pattern), could be selected but this would impair time multiplexing of different patterns (e.g. for other UEs), since possibly all transmit opportunity time offsets would end up being selected. On the contrary, using an additional resource pattern enable to optimize the resource utilization such as the latency requirement is still fulfilled, but time multiplexing is not impaired (in above example, all other resource time offsets are free to be used for other patterns).

As an option, the number of consecutive resources (i.e. transmission grants) configured at each period may be configured as well. This enables the system to handle traffic with a known ingress window (arrival time+jitter) with lower latency. When N consecutive grants are configured, such grants may be configured from the boundary/resource pattern, by considering (selecting) N consecutive grant resources, starting for instance from the earliest resource from that pattern following or including the indicated Symbol.

In another option, assuming the gNB knows the egress window (leaving time, with possibly associated jitter), the pattern may be defined relative to such leaving time. In this case, instead of considering the earliest resource(s) from the resource pattern after the indicated symbol, it should be possible to consider the latest resource(s) from the resource pattern before the indicated symbol.

Additional flexibility may be gained by accommodating preconfigured grant periodicities or ATW periodicities that are not divisors of the hyperframe length.

Figure 11:
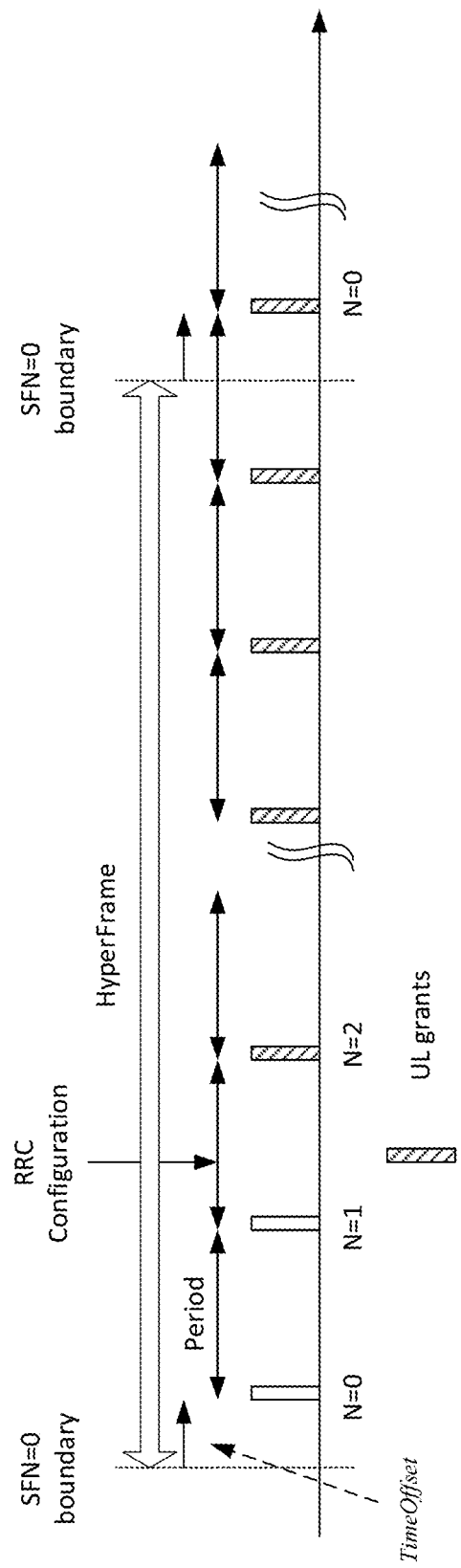
FIG. 11 shows an example where the preconfigured resource period is a divisor of the hyperframe length.

As shown in FIG. 11 when the preconfigured grant period is a divisor of the hyperframe length the resource locations can be defined as an offset from SFN 0, which gives the same position in each hyperframe. However, as shown in FIG. 10, if the period is not a divisor of the hyperframe length the position of preconfigured resources various depending on the number of hyperframes from the first occurrence. The UE must thus know which hyperframe boundary defines SFN 0 from which the offset is defined.

This difficulty may be addressed by ensuring the base station only transmits a configuration message (for example an RRC message) sufficiently early in a hyperframe to ensure it is received and processed prior to the start of the next hyperframe. The correct SFN 0 is thus indicated implicitly by the transmission time of the configuration message. However, such a system requires close interaction of the indication (for example RRC message) with the SFN (layer 1) timing, which is undesirable. The method also limits the opportunities for a base station to transmit the configuration message.

In an alternative option the configuration message (for example RRC message) a time reference may be indicated from which the offset is applied. The time reference may be an SFN, optionally in the future, or a part of the SFN which can identify a location unambiguously (for example a set number of the MSBs of the SFN). In an example only the MSB may be utilised indicating either the next SFN 0 boundary or the next SFN 512 (middle of a hyperframe) boundary. This gives up to 5.12 s of latency for correct identification which is anticipated to be much higher than the expected RRC latency.

Figure 12:
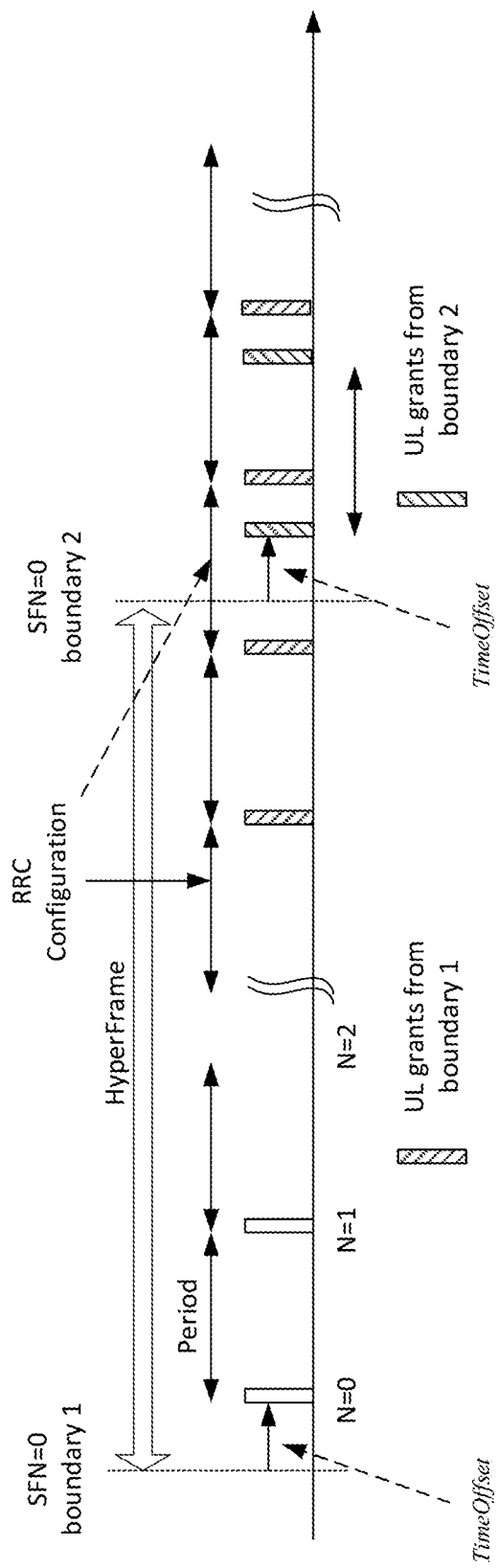
FIG. 12 shows an example of resources defined relative to an SFN boundary.

In the example of FIG. 11 the RRC configuration message would indicate the SFN 512 boundary, whereas the RRC configuration message of FIG. 12 would indicate the SFN 0 boundary, as these are the next relevant boundaries after the configuration message. The configuration message (in this example only an RRC message) must be transmitted sufficiently in advance of the indicated boundary to be received and actioned.

In addition to existing RRC parameters for CG Type 1, RRC could also configure timeReferenceSFN: Time reference SFN. If the existing formula adds this offset (converted into symbols) to the existing time offset timeDomainOffset×numberOfSymbolsPerSlot+S, as follows, after an uplink grant is configured for a configured grant Type 1, the MAC entity shall consider that the uplink grant recurs associated with each symbol for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+N×periodicity)modulo(1024×numberOfSlotsPerFrame×numberOfSymbolsPerSlot), for all $N>=0$.

the result on FIG. 12 would be a superposition of all preconfigured resources.

In order to avoid delays in the activation of preconfigured resources the initial formula may be adapted as follows. After an uplink grant is configured for a configured grant Type 1, the MAC entity shall consider sequentially that uplink grants occur associated with the symbol for which:

[(SFN×numberOfSlotsPerFrame×numberOfSymbolsPerSlot)+(slot number in the frame×numberOfSymbolsPerSlot)+symbol number in the slot]=(SFN$_{start\ time}$×numberOfSlotsPerFrame×numberOfSymbolsPerSlot+timeDomainOffset×numberOfSymbolsPerSlot+S+N×periodicity) modulo(1024×numberOfSlotsPerFrame×numberOfSymbolsPerSlot)

where SFN$_{start\ time}$ is the SFN timeReferenceSFN immediately preceding the reception of the configured grant Type 1 configuration.

Equivalently, where SFN$_{start\ time}$ is the SFN timeReferenceSFN immediately following the reception of the configured grant Type 1 configuration (assuming N can be negative in the formula).

Figure 13:
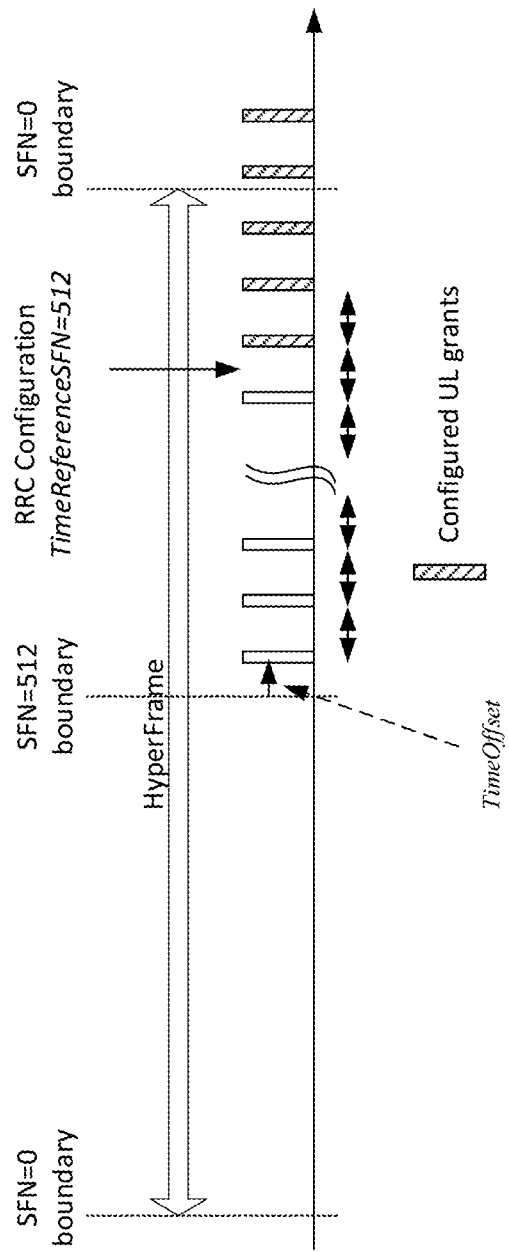
FIG. 13 shows an example with $SFN_{start\ time}$ being the SFN timeReferenceSFN.

FIG. 13 shows an example with SFN$_{start\ time}$ being the SFN timeReferenceSFN immediately preceding the reception of the configured grant Type 1 configuration.

The same mechanism can be used to configure with RRC an Allowed Transmission Window Periodicity not dividing the HF length.

Within the TSN network, it is expected that for a TSN flow, the 5GS can have TSN flow traffic information such as periodicity, but also (see FIG. 3): ingress (arrival) time window (or equivalently, arrival time offset and jitter around the arrival time). egress time window (as negotiated during the schedule establishment) (or equivalently, leaving time offset and jitter around the leaving time)

It is proposed that in addition to already discussed traffic information such as periodicity, message size, reference time or offset, the gNB is also made aware of the ingress time window (size/offset, or equivalently jitter around the arrival time) and/or egress time window (as negotiated during the schedule establishment), or equivalently, leaving time offset and jitter around the leaving time).

This information can be leveraged to enhance scheduling, as described in other parts of the proposal.

The knowledge of ingress time window allows configuring resources within the window, thereby reducing the latency.

The knowledge of egress time window allows relaxing RAN requirements to enable better usage of radio resources. For instance, assuming a periodic traffic with a fixed leaving time pattern, this information could be used by the RAN to configure 1 resource before each leaving instant time.

In order to avoid wasting preconfigured resources when no TSN data is available, the preconfigured resources can be deactivated/reactivated outside of each ingress time window. However, such a process will increase control signalling overhead, and there is a risk of failed reactivation which would lead to significantly increased latency. The need for control signalling could be reduced by including a window length, or number of repetitions of the preconfigured resources, when activating the resources such that the preconfigured resources are only activated for that window or number of repetitions. This removes the need for a deactivation message (for example a DCI), but the reactivation message is still required which represents a large portion of the control signalling overhead and still retains the risk of a lost signal.

In order to mitigate the overhead a suspend state may be introduced in which the configured grant resources (e.g. CG Type 2) configuration remains stored but is not active (i.e. not delivered to the HARQ entity). The configuration is defined such that the preconfigured resources automatically transition to the suspended state after a configured window length or number of repetitions of the preconfigured resources. A message is then utilised to resume active operation based on the prior configuration, for example a DCI message may be transmitted. The DCI used for deactivation might be reused for resumption, relying for instance on the fact that deactivation is no longer needed due to the new autonomous suspension mechanism. The message to resume operation may also adjust parameters of the preconfigured resources, for example the time offset, for example to better match traffic patterns. Such techniques may be principally relevant to CG Type 2 configurations but may also apply to other preconfigured resources such as CG type 1. The reduced signalling overhead may still be significant depending on the TSN parameters.

In 802.11Qbv, TSN traffic is based on a cyclic pattern, each pattern defined by on-off periods which can be of any size or offset. The above patterns may be extended to include such cyclic patterns. Alternatively, using multiple CG also enables to implement such patterns.

The ATW described hereinbefore may be configured for a group of UEs sharing the same time restrictions. For such configuration, group based signaling could be used, either dedicated or broadcasted. This may enable for instance to restrain group of UEs to transmit only during specific time windows.

There are therefore provided a number of processes and systems for managing preconfigured resources, in particular wireless transmission resources. The disclosure particularly addresses the management of preconfigured resources in relation to Time Sensitive Network (TSN) data transmission. In addition to allocating periodic preconfigured resources, an allowed transmission window (ATW) is defined. The ATW defines which occurrences of the preconfigured resources may be utilised for transmission, in particular which uplink transmission resources may be utilised by a UE. The ATW may be aligned with the expected time of arrival of TSN data (typically the ingress time window) such that the TSN data can be promptly transmitted. The occurrences which occur outside of the ATW are not to be used for transmission and hence may be re-allocated by the base station for other uses. The ATW may be defined by its offset from a defined boundary, for example a hyperframe boundary. The boundary may be SFN 0, or another SFN within the hyperframe. The length and periodicity of the ATW may also be defined. The ATW may be communicated to a UE using a configuration message, for example an RRC message. The configuration message may indicate the boundary from which an offset is defined. For example, the message may indicate that the boundary is the next occurrence of a defined SFN.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for a configuration of preconfigured transmission resources in a cellular communications network, the method comprising the steps of:
    configuring periodic transmission resources for transmission of data from a mobile device to a base station; and
    transmitting an indication of the periodic transmission resources from the base station to the mobile device in a configuration message, wherein the indication includes an offset (TimeDomainOffset) from a time reference SFN (timeReferenceSFN) to the periodic transmission resources, wherein the time reference indicates a most recent previous occurrence of a System Frame Number (SFN) prior to a reception of the configuration message.

2. The method according to claim 1, wherein the configuration message includes the time reference.

3. The method according to claim 1, wherein the time reference is indicated implicitly by a transmission time of the configuration message.

4. The method according to claim 1, wherein a period of the transmission resources is not a divisor of a hyperframe length which is 1024 sub frames.

5. The method according to claim 1, wherein the time reference is SFN 0 or SFN 512.

6. The method according to claim 1, wherein after an uplink grant is configured for a configured grant Type 1, a MAC entity shall consider that the uplink grant recurs associated with each symbol for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+$N$×periodicity) modulo (1024×numberOfSlotsPerFrame×numberOfSymbolsPerSlot), for all $N \geq 0$.

* * * * *